May 23, 1967

N. I. PALMER 3,321,334

FUEL CELL UNIT

Filed July 11, 1962

NIGEL I. PALMER
INVENTOR.

BY
Watson, Cole, Grindle & Watson
ATTORNEYS

May 23, 1967 N. I. PALMER 3,321,334
FUEL CELL UNIT
Filed July 11, 1962 4 Sheets-Sheet 2
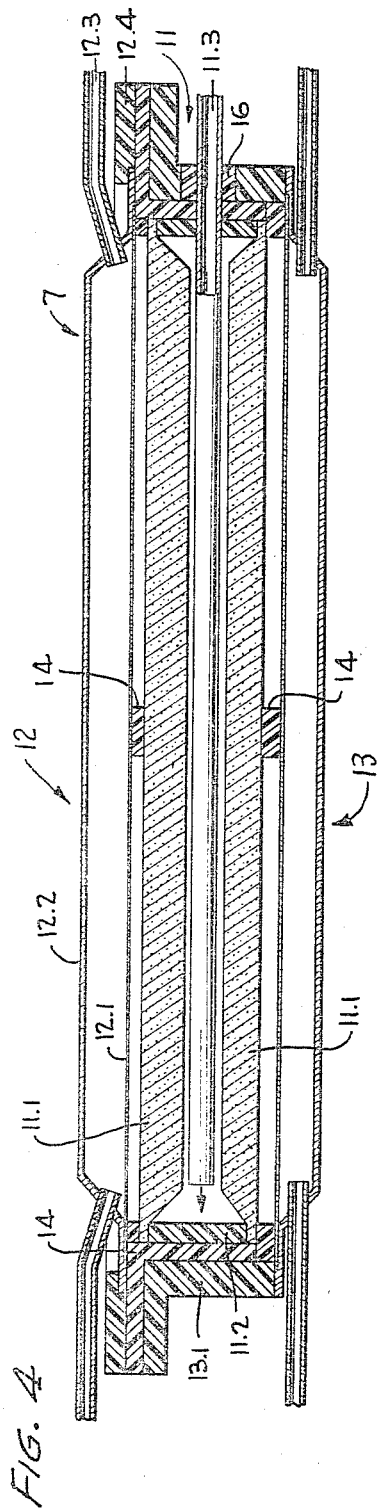
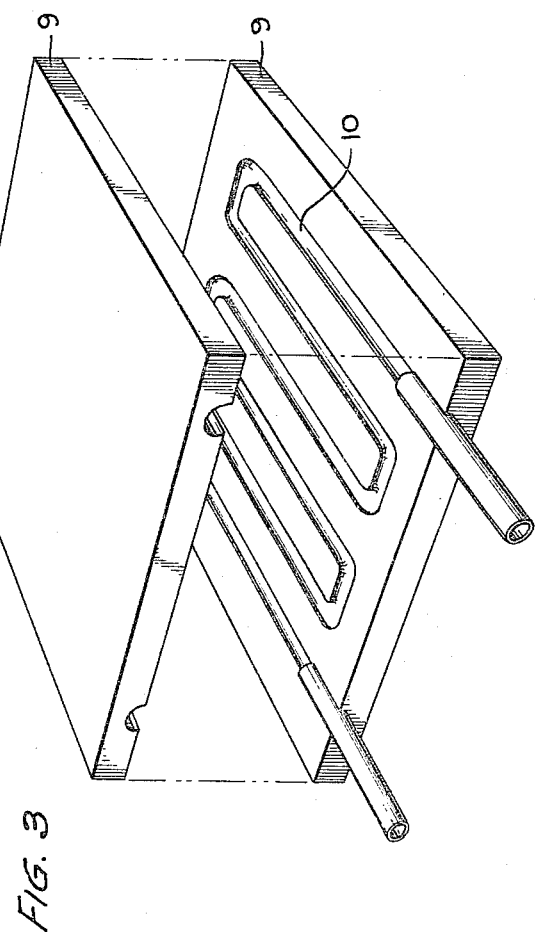
NIGEL I. PALMER
INVENTOR.
BY Watson, Cole, Grindle & Watson
ATTORNEYS

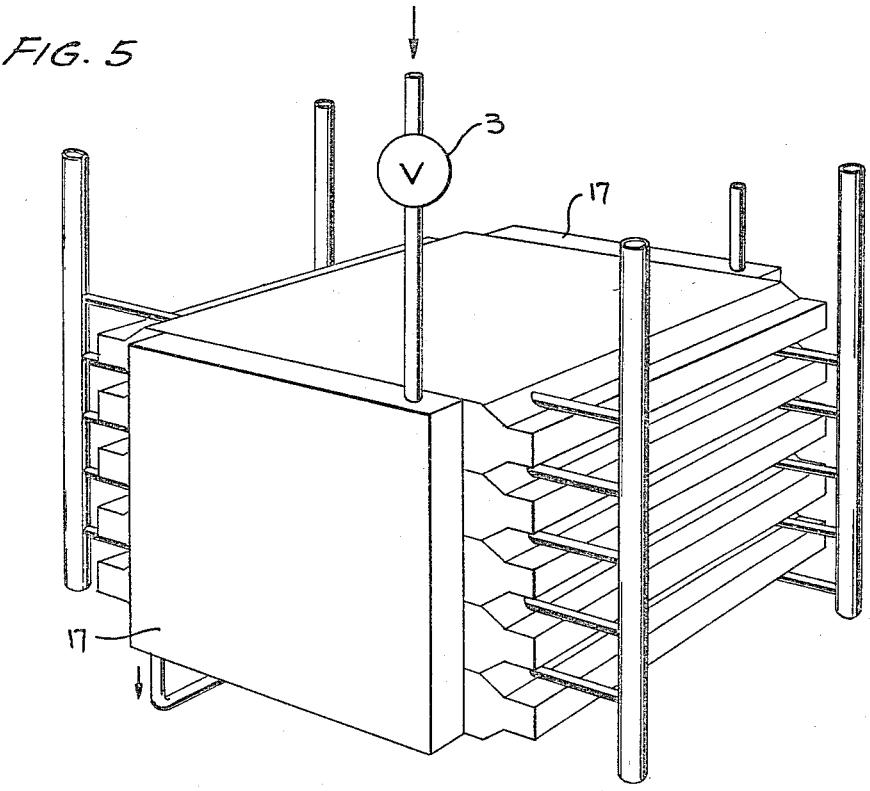

INVENTOR,
NIGEL I. PALMER

United States Patent Office 3,321,334
Patented May 23, 1967

3,321,334
FUEL CELL UNIT
Nigel I. Palmer, New York, N.Y., assignor to Leesona Corporation, Warwick, R.I., a corporation of Massachusetts
Filed July 11, 1962, Ser. No. 209,165
2 Claims. (Cl. 136—86)

This invention relates to an improved fuel cell and more particularly to a fuel cell unit which beneficially disposes of the waste heat of the cell. The fuel cell is characterized by vaporizing a liquid fuel directly within, or immediately adjacent a fuel cell. The heat of vaporization cools the fuel cell and accomplishes useful work.

The term "fuel cell" as employed herein denotes an electrochemical cell in which the free energy of reaction is converted directly into electrical energy. Such cells in their most simplified form comprise a housing, an oxidizing electrode, a fuel electrode, an electrolyte and means for supplying fuel and oxidant to the respective electrodes. At a fuel-electrolyte interface of the anode, fuel reacts with an ionic oxidizing agent leaving the electrode electrically charged. The electric charges are drawn off through an external route to generate more of the oxidizing ions at the cathode. These ions then migrate to the anode to complete the circuit.

Although fuel cells are attractive commercially due to their high degree of efficiency, the presently known cells are plagued with certain disadvantages from a practical standpoint. One problem encountered, particularly in mobile units or units which must necessarily be confined to a relatively close space, is the removal of waste heat from the cells. Thus, although the fuel cell is not controlled or governed by Carnot's Heat Law, a certain amount of waste heat is still produced by the fuel cell reaction. Thus, as the load is increased the proportion of the fuel energy released as waste heat increases and the part converted into electricity decreases. Although, in the prior art cells various ways are suggested for cooling the cell such as water cooling, no beneficial use of the heat has been made.

Accordingly, it is an object of the instant invention to provide a fuel cell which beneficially disposes of the waste heat of the fuel cell reaction.

It is another object of the instant invention to provide an improved fuel cell employing liquid fuels, either directly or indirectly, while demonstrating the electrochemical activity of a gaseous fuel.

It is another object of the instant invention to provide a fuel cell which utilizes a liquid fuel, either directly or indirectly, and vaporizes the fuel prior to its introduction to the anode.

These and other objects of the instant invention will become more apparent from the following detailed description with particular emphasis being placed on the illustrative example and drawing.

According to the instant invention, a liquid fuel employed directly or indirectly at the anode of the fuel cell is caused to vaporize within, or immediately adjacent the fuel cell. The heat of vaporization removes the waste heat from the cell, cooling the unit and at the same time accomplishes useful work in the vaporization of the fuel prior to its introduction to the anode of the fuel cell A fuel cell system and the components thereof illustrating the instant invention are set forth in the drawing.

FIGURE 3 is a diagrammatic illustration of a preferred inactive cooling module;

FIGURE 4 is an illustration in section of an active module;

FIGURE 5 is a second embodiment of a fuel cell stack comprising cooling units positioned externally in relation to the actual fuel cell.

Figure 1:
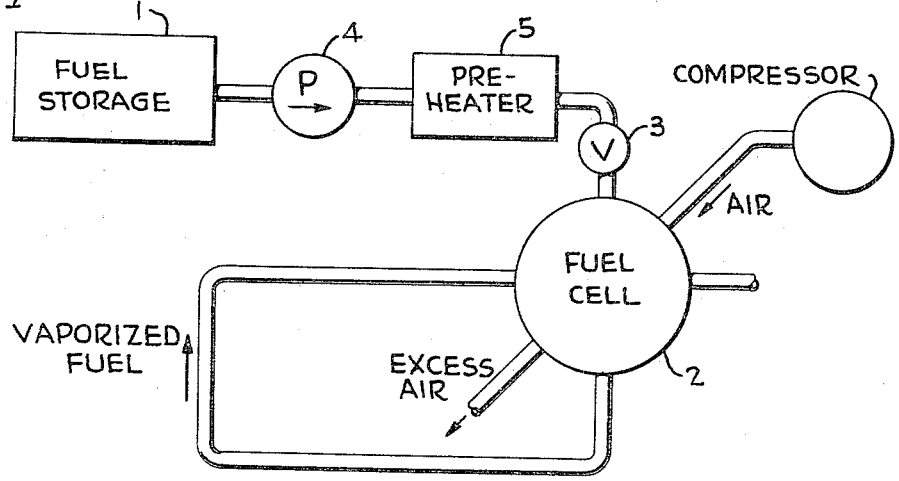
FIGURE 1 is a diagrammatical illustration in block form of the fuel cell system.
Figure 6:
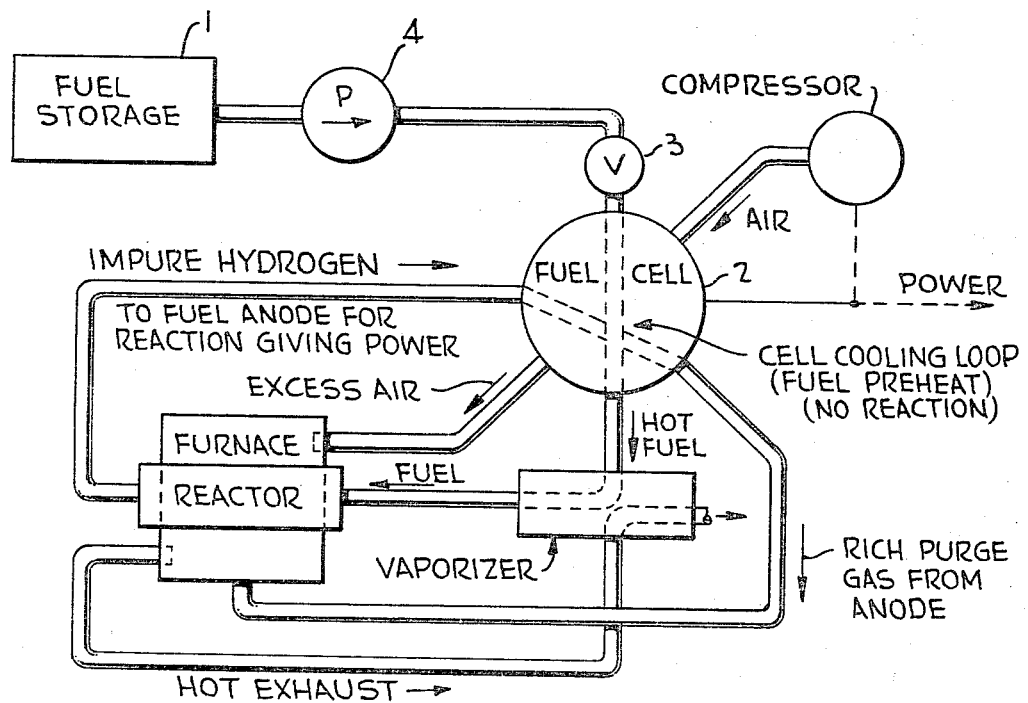
FIGURE 6 is a diagrammatic illustration of the fuel cell system in block form comprising a reactor.

Referring more specifically to the drawing, a liquid fuel is passed from storage unit 1 to fuel cell 2 through valve 3. The liquid fuel is flash-vaporized within the fuel cell utilizing the waste heat of the cell reaction. The vaporized fuel is then fed directly to the fuel compartment of the fuel cell, as shown in FIGURE 1, or it can be passed through a reactor unit 4, as shown in FIGURE 6, and converted into hydrogen and by-products. The hydrogen-rich stream is then fed to the anode of the fuel cell. Fuel cell systems indirectly using a liquid fuel are described completely in my co-pending application, entitled, "Improved Fuel Cell Systems," Serial No. 209,079 of even date.

Substantially any liquid fuel can be employed in the instant fuel cells as long as the fuel is capable of being vaporized at the temperature of the cell and providing that or its derivatives can be oxidized in the cell. Ammonia is particularly well suited due to its high volatility, permitting substantially instantaneous vaporization within the unit. Thus, the flash-vaporization causes the fuel cell unit to function substantially as a refrigerating unit. Other fuels particularly desirable include the low molecular weight hydrocarbons, such as methane, ethane, propane, butane and mixtures thereof, and the corresponding alcohols. When some of these fuels are employed, it may be necessary to insert a pump 4 between the fuel storage unit 1 and the valve 3 to pump the fuel. Additionally, depending upon the temperature of the fuel cell, it may be necessary to employ a heater 5, to preheat the fuel prior to introduction into the cell to assure flash-vaporization within the unit. Other liquid fuels including the acetate, ketones, kerosene, naphtha may be employed. The instant cells permit the use of relatively inexpensive fuels. However, since the fuel is vaporized prior to its introduction into the anode, substantially the efficiencies of a gaseous fuel are realized with the economy of liquid fuels. Of greater practical importance, however, is the convenient removal of waste heat from the fuel cell permitting the use of the fuel cell in applications where space is limited.

The instant novel method of cooling a fuel cell can be utilized in conventional prior art fuel cells with suitable modifications. Thus, the anodes of the cell can be homoporous and bi-porous structures including those prepared by sintering pure or substantially pure metal powders. Additionally, carbon substrate electrodes or carbon substrate electrodes which have been activated with a catalytic material from groups VIII or IB of the Mendelyeev's Periodic Table have been found to be advantageous. The non-porous palladium-silver alloy hydrogen diffusion electrodes such as those described in the Oswin and Oswin et al. co-pending applications, Serial Nos. 51,515, now U.S. Patent No. 3,092,517 and 190,695, now Patent No. 3,291,-643, filed August 24, 1960, and April 27, 1962, respectively, are particularly suitable, provided the fuel, after vaporization, is passed through a reactor to convert the fuel into hydrogen. The non-porous palladium-silver alloy hydrogen diffusion electrodes only permit the passage of pure hydrogen allowing the convenient removal of inerts and impurities by venting.

Cathodes which can be conveniently employed include the homo- and bi-porous electrode structures described by Francis T. Bacon in U.S. Patent No. 2,716,670 which are nickel electrodes having a surface coating of lithiated nickel oxide. The lithiated nickel-oxide film is highly resistant to oxidation but yet readily conducts an electric current. Other cathodes found particularly effective are the cobalt-nickel activated bi-porous nickel electrodes described more fully in the Lieb et al. co-pending application, Serial No. 165,212, now abandoned, filed January 9, 1962, entitled "Fuel Cell Electrodes."

Figure 2:
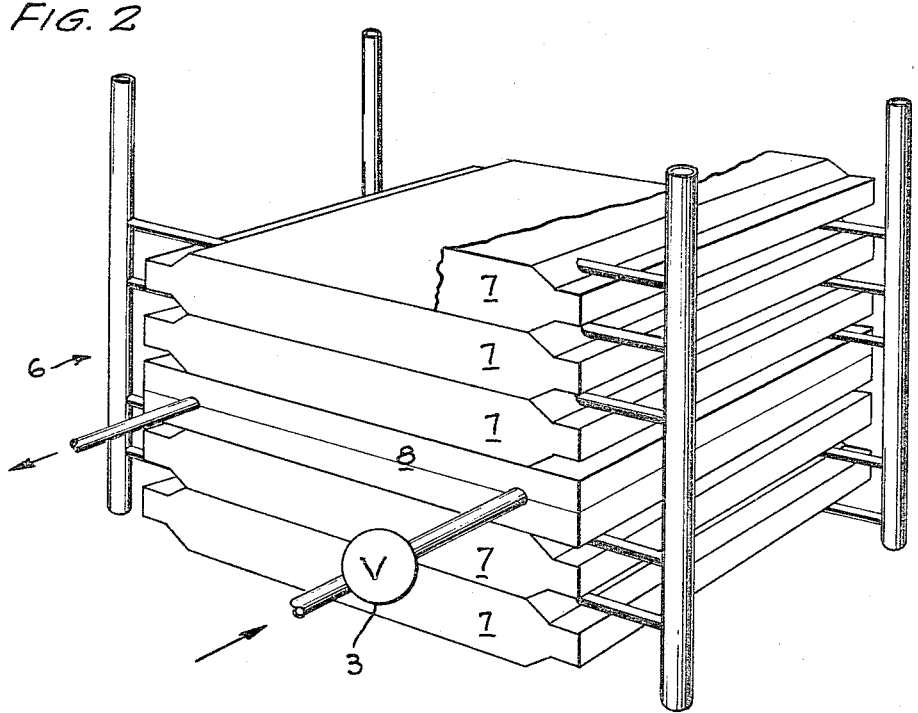
FIGURE 2 is a diagrammatic illustration of a fuel cell stack containing active and inactive modules.

To more particularly demonstrate the invention, FIGURE 2 illustrates diagrammatically a fuel cell unit 6, composed of several individual fuel cell modules 7 interspersed with dummy modules 8 for removal of the waste heat. Thus, liquid fuel enters the unit 6 through valve 3 and circulates through units 8 where the fuel is vaporized, utilizing waste heat of the unit, thereby cooling the cell.

One embodiment of the dummy modules is illustrated in FIGURE 3. Thus, two flat sheets of copper 9 are pressed together having internal channels 10 for circulation of the fuel. Modifications of the dummy unit will be apparent to those skilled in the art.

The fuel cell modules 7 can be any of the prior art devices suitably modified. Modules which particularly are well adapted for use in the instant invention are described in the Delfino co-pending applications, Serial Nos. 203,056, now Patent No. 3,288,644 and 203,057 filed June 18, 1962.

FIGURE 4 is a cross-sectional view of one such module. The module 7 contains a double cathode assembly 11 made of two bi-porous cathodes 11.1 attached back-to-back to a metal separator 11.2 and including gas ports 11.3 for entry and exit of air. Anode assembly 12 consists of a palladium-silver alloy membrane 12.1 welded or brazed to a metal back-up plate 12.2. The back-up plate is shaped to form a gas chamber behind the anode and has two diametrically opposed gas chambers 12.3 welded to it for entry and exit of hydrogen. In addition a clamping ring 12.4 is welded to the back-up plate. Anode assembly 13 is identical to assembly 12 except that the clamping plate is replaced by flange cylinder 13.1 welded to the back-up plate. The cylinder, together with the gasket and anodes of anode assemblies 12 and 13, serves as a container for the cathodes and electrolyte. Teflon insulator 14 insulates the cathode from the anode cylinder and serves as a sealing gasket between the flange and clamping ring. Teflon spider 14 controls the gap between the anode and cathode, which space is filled with electrolyte. Thus, the thickness of the Teflon spider determines the electrolyte volume. Additionally, the Teflon spider support the electrodes against gas pressure. Teflon bushing 16 insulates the cathode gas ports from the anode housing. As is apparent since the module described in FIGURE 3 utilizes non-porous palladium-silver alloy membrane anodes, the fuel consumed must necessarily be hydrogen. Therefore, the unit depicted in FIGURE 2 must be utilized in combination with a reactor for converting the liquid fuel into hydrogen. As is apparent, however, a porous anode can be employed in place of the hydrogen diffusion anode in the described module design and the vaporized liquid fuel used directly.

FIGURE 5 illustrates diagrammatically a second fuel cell unit wherein cooling coils 17 are positioned externally in relation to the actual fuel cell. The liquid fuel again enters the coils from valve 3 and is circulated through the cell with vaporization of the fuel taking place utilizing the waste heat of the fuel cell reaction, thereby cooling the unit.

The fuel cell of the instant invention can be operated at substantially any temperature with either air or oxygen as the oxidizing agent. Additionally, a variety of electrolytes can be employed including aqueous alkaline materials such as potassium hydroxide, sodium hydroxide, lithium hydroxide, mixtures thereof, potassium carbonates and the alkanolamines. Acid electrolytes can be employed including sulfuric and phosphoric acid.

In order to more completely illustrate the utility of the invention described herein, the following embodiment is set forth. Thus, a fuel cell system substantially identical to the fuel cell unit of FIGURE 2 is constructed employing individual modules, substantially as depicted in FIGURE 4, cascaded or stacked as a unit having dummy modules, substantially as described in FIGURE 3, interspersed intermittently as shown in FIGURE 2. The anode is a bi-porous carbon substrate structure impregnated with a platinum catalyst. The cathode is a bi-porous cobalt-nickel oxide activated nickel electrode. The cell is operated at 200° C. with a 75% aqueous potassium hydroxide electrolyte and using scrubbed air as the oxidant at 8.0 p.s.i.g. which is passed through the fuel cell at a rate sufficient to consume only approximately 50% of the available oxygen. Liquid ammonia is passed from the fuel storage unit 1 into the fuel cell 2 through valve 3 where the ammonia is vaporized. The vaporized fuel is passed from the dummy units of the cell directly into the fuel cell where it is consumed. The fuel cell provides a steady current density of 25 ma./cm.$^2$.

While various modifications of this invention are described, it should be appreciated that this invention is not restricted thereto, but that other embodiments will be apparent to one skilled in the art which fall within the scope and spirit of the invention and the appended claims.

What is claimed is:

1. A fuel cell unit for the direct generation of electricity from a liquid fuel and an oxidant comprising a series of active modules interspersed intermittently with inactive modules, said inactive modules having channels for circulating fuel and absorbing the waste heat of the active modules, causing vaporization of the circulating liquid fuel, thereby cooling the fuel cell unit and rendering the fuel more reactive.

2. A fuel cell unit for the direct generation of electricity from a liquid fuel and an oxidant comprising a series of active modules in physical contact with inactive modules, said inactive modules having means for circulating fuel and absorbing the waste heat of the active modules, causing vaporization of the circulating liquid fuel, thereby cooling the fuel cell unit and rendering the fuel more reactive.

References Cited by the Examiner

UNITED STATES PATENTS

| | | | |
|---|---|---|---|
| 2,289,610 | 7/1942 | Wallace | 136—86 |
| 2,384,463 | 9/1945 | Gunn et al. | 136—86 |
| 2,901,524 | 8/1959 | Gorin et al. | 136—86 |
| 2,980,749 | 4/1961 | Broers | 136—86 |

WINSTON A. DOUGLAS, *Primary Examiner.*

JOHN R. SPECK, *Examiner.*

H. FEELEY, *Assistant Examiner.*